US007522473B2

(12) United States Patent
Zlotnik et al.

(10) Patent No.: US 7,522,473 B2
(45) Date of Patent: Apr. 21, 2009

(54) CONTROLLED ACOUSTIC BEAM GENERATOR FOR CROWD CONTROL

(75) Inventors: Zvi Zlotnik, Haifa (IL); Eitan Zeiler, Haifa (IL)

(73) Assignee: Electro-Optics Research and Development Ltd., Haifa (IL)

( * ) Notice: Subject to any disclaimer, the term of this patent is extended or adjusted under 35 U.S.C. 154(b) by 0 days.

(21) Appl. No.: 10/578,721

(22) PCT Filed: Nov. 4, 2004

(86) PCT No.: PCT/IL2004/001013

§ 371 (c)(1), (2), (4) Date: Mar. 6, 2007

(87) PCT Pub. No.: WO2005/045456

PCT Pub. Date: May 19, 2005

(65) Prior Publication Data

US 2007/0258328 A1 Nov. 8, 2007

(30) Foreign Application Priority Data

Nov. 11, 2003 (IL) ...................................... 158837

(51) Int. Cl.
*H04B 1/02* (2006.01)

(52) U.S. Cl. ...................................................... 367/139

(58) Field of Classification Search ................. 367/139, 367/138

See application file for complete search history.

(56) References Cited

U.S. PATENT DOCUMENTS

| | | | | |
|---|---|---|---|---|
| 4,349,898 | A | 9/1982 | Drewes et al. | |
| 5,610,876 | A | 3/1997 | Jeffers | |
| 5,636,180 | A | 6/1997 | Grothaus et al. | |
| 5,969,593 | A | 10/1999 | Will | |
| 6,052,336 | A | 4/2000 | Lowery, III | |
| 6,359,835 | B1 | 3/2002 | Gayl | |
| 2007/0258328 | A1 * | 11/2007 | Zlotnik et al. | 367/139 |

FOREIGN PATENT DOCUMENTS

WO WO 2005045456 A2 * 5/2005

OTHER PUBLICATIONS

International Search Report for PCT/IL04/01013 mailed Aug. 30, 2005.

* cited by examiner

*Primary Examiner*—Dan Pihulic
(74) *Attorney, Agent, or Firm*—Pearl Cohen Zedek Latzer, LLP

(57) ABSTRACT

A controlled acoustic beam generator system comprising: an array of acoustic transmitters; a signal generator, amplifier for amplifying the acoustic signal; multi-channels signal processor, for processing the acoustic signal, distributing corresponding processed acoustic signals, into the array of acoustic transmitters; steering for steering an acoustic beam which is the resultant of transmitted processed signals by the array of acoustic transmitters; and a control unit, for the operation of the system, by controlling the signal generator, the multi-channel signal processor, and the steering.

29 Claims, 4 Drawing Sheets

CONTROLLED ACOUSTIC BEAM GENERATOR FOR CROWD CONTROL

CROSS-REFERENCE TO RELATED APPLICATIONS

This application is a National Phase Application of PCT International Application No. PCT/IL2004/001013, International Filing Date Nov. 4, 2004, claiming priority of IL Patent Application, 158837, filed Nov. 11, 2003.

FIELD OF THE INVENTION

The present invention relates to crowd control means. More particularly it relates to non-lethal crowd-control means in the form of high-power controlled acoustic beam generator.

BACKGROUND OF THE INVENTION

In many public events, gatherings or riots, police or other law enforcement forces are sometimes forced to use crowd-control means in order to maintain order and prevent chaos. The use of firearms is considered extremely undesired as it inevitably leads to casualties among the crowd and is therefore regarded as highly unacceptable.

Non-lethal crowd-control means were developed to aid law-enforcing forces to maintain order without causing unnecessary injuries or casualties. Among these are passive means, such as fences, and other confining means and active means, such as water-hoses, tear-gas, unpleasant foams and odors, and acoustic generators.

Acoustic generators are known to be useful for crowd control, generating acoustic waves directed to a certain area, which cause anything between mild to intolerable noise, repelling people from that area.

It is a purpose of the present invention to provide a non-lethal crowd-control means in the form of a high-power acoustic generator array.

It is another purpose of the present invention to provide a non-lethal crowd-control means in the form of a high-power acoustic generator array, which may be easily directed at specific targets.

Yet another purpose of the present invention is to provide such a non-lethal crowd-control means in the form of a high-power acoustic generator array that needs no mechanical reorientation in order to be aimed at specific targets.

SUMMARY OF THE INVENTION

There is thus provided, in accordance with a preferred embodiment of the present invention, a controlled acoustic beam generator system comprising:

an array of acoustic transmitters;

a signal generator, for generating an acoustic signal of predetermined properties;

amplifying means for amplifying the acoustic signal;

multi-channels signal processor, for processing the acoustic signal, distributing corresponding processed acoustic signals, having predetermined properties, including amplitude and phase, into the array of acoustic transmitters;

steering means, for steering an acoustic beam which is the resultant of transmitted processed signals by the array of acoustic transmitters; and a control unit, for the operation of the system, by controlling the signal generator, the multi-channel signal processor, and the steering means.

Furthermore, in accordance with a preferred embodiment of the present invention, the steering means comprises phased array control.

Furthermore, in accordance with a preferred embodiment of the present invention, the phased array means is incorporated in the multi-channels signal processor.

Furthermore, in accordance with a preferred embodiment of the present invention, the steering means comprises mechanical steering means.

Furthermore, in accordance with a preferred embodiment of the present invention, the mechanical steering means comprises a hydraulic steering device.

Furthermore, in accordance with a preferred embodiment of the present invention, the system is powered from the main power supply.

Furthermore, in accordance with a preferred embodiment of the present invention, the system is powered from a power supply generator.

Furthermore, in accordance with a preferred embodiment of the present invention, the control unit is partially or in whole a remote control unit.

Furthermore, in accordance with a preferred embodiment of the present invention, the control unit is provided with a beam direction selector for selecting a desired direction for the acoustic beam.

Furthermore, in accordance with a preferred embodiment of the present invention, the control unit is provided with a program selector, for selecting a desired signal program, form a set of predefined signal programs.

Furthermore, in accordance with a preferred embodiment of the present invention, the control unit is provided with a power level selector for selecting a desired power level for the system.

Furthermore, in accordance with a preferred embodiment of the present invention, the system is adapted to be mounted on a vehicle.

Furthermore, in accordance with a preferred embodiment of the present invention, the system is adapted to be mounted on a marine vessel.

Furthermore, in accordance with a preferred embodiment of the present invention, the array of acoustic transmitters is adapted to be mounted below water level.

Furthermore, in accordance with a preferred embodiment of the present invention, the system is adapted to be mounted on a floating platform.

Furthermore, in accordance with a preferred embodiment of the present invention, the array of acoustic transmitters is adapted to be mounted submerged below water level.

Furthermore, in accordance with a preferred embodiment of the present invention, the array of acoustic transmitters comprises a plurality of sets of acoustic transmitter arrays.

Furthermore, in accordance with a preferred embodiment of the present invention, sets of acoustic transmitter arrays are operable separately or simultaneously as desired.

Furthermore, in accordance with a preferred embodiment of the present invention, the system is adapted to be airborne.

Furthermore, in accordance with a preferred embodiment of the present invention, incorporating transmission of hidden messages.

Furthermore, in accordance with a preferred embodiment of the present invention, the system is mounted on a stationary support.

Furthermore, in accordance with a preferred embodiment of the present invention, the system is submerged in water.

Furthermore, in accordance with a preferred embodiment of the present invention, the array of acoustic transmitters comprises acoustic transmitters having outlets of uniform shape.

Furthermore, in accordance with a preferred embodiment of the present invention, wherein the uniform shape is circular.

Furthermore, in accordance with a preferred embodiment of the present invention, the uniform shape is polygonal.

Furthermore, in accordance with a preferred embodiment of the present invention, the uniform shape is hexagonal.

Furthermore, in accordance with a preferred embodiment of the present invention, the array of acoustic transmitters is arranged in a beehive formation.

Furthermore, in accordance with a preferred embodiment of the present invention, the signal generator generates continuous wave acoustic signals.

Furthermore, in accordance with a preferred embodiment of the present invention, the signal generator generates acoustic signal pulses at constant frequency with desired adjustable ratio between the pulse period and interval between the pulses.

Furthermore, in accordance with a preferred embodiment of the present invention, the signal generator generates acoustic signal pulses at variable amplitude levels and frequencies.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

A main aspect of the present invention is the provision of a high-power acoustic generator system, which produces controlled high power controllable acoustic beam, preferably in, but not limited to, the width range of 8° to 10° (depending on the transmittance frequency). In a preferred embodiment of the present invention the beam can be steered horizontally in a typical sector width of ±45°.

In order to achieve a controlled acoustic beam an array of acoustic transmitters is used, so as to achieve coherent summation of multiple acoustic transmitters, bearing in mind that when radiation is summed up coherently the power gain is expressed as:

$$\Delta I \approx N^2 I_0$$

where $I_0$ is the power of a single acoustic transmitter, and N is the number of independent acoustic transmitters used.

The high-power acoustic generator system of the present invention is to be used as a non-lethal weapon system for riot control and for fending off intruders.

Another aspect of the present invention is the provision of a steerable controlled high power beam, either by mechanical means, by electronic means or both.

Figure 1:
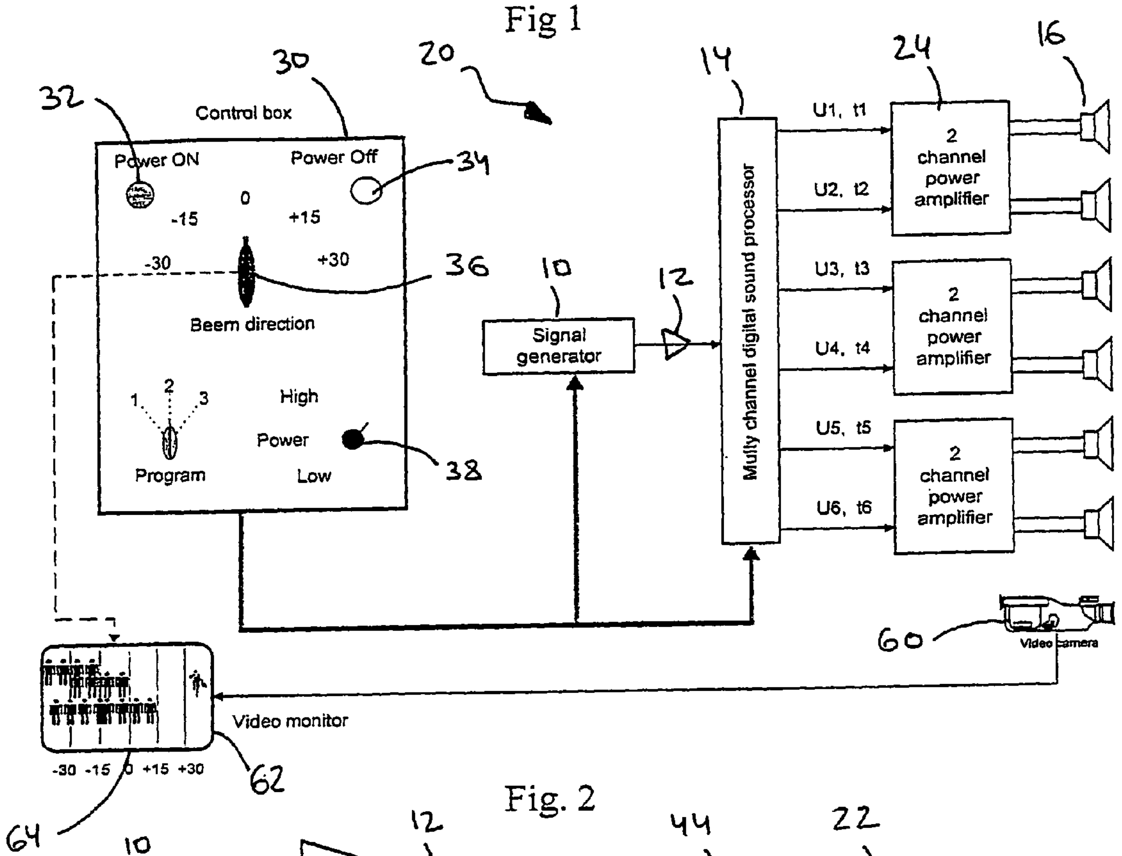
FIG. 1 illustrates a block diagram of a high-power controlled acoustic beam generator for crowd control in accordance with a preferred embodiment of the present invention.

Reference is now made to FIG. 1 illustrating a block diagram of a high-power acoustic generator array 20 for crowd control in accordance with a preferred embodiment of the present invention.

A signal generator 10 is used to feed a signal to a multi-channel sound processor 14 via amplifier (or amplifiers) 12. The system is powered by energy source 18, (for example the mains power supply or a power generator). The multi-channel processor is adapted to divide and synchronize the signal into an array of acoustic transmitters 22, preferably via channel power amplifiers 24. The acoustic waves generated from the acoustic transmitters array is combined to a controlled high-power controllable acoustic beam.

The steering of the beam is done using phased array arrangement, where each channel is fed with wave parameters (amplitude Ui, and phase ti), and by manipulating the phase the beam is steered.

An optional control box 30 may include power on/off switches 32, 34, beam direction selector 36, which in the example shown in this figure facilitates spanning the beam between −30 to +30 degrees in 15 degrees intervals. The range is arbitrary and can be set-up according to specific targets and apparatus limitations. In another embodiment of the present invention the spanning of the beam is carried out continuously (and not discretely as in FIG. 1).

Other optional features may include control of the power output, here in the form of a power selector 38 (switching between low and high power output, continuously or discretely), and program selector 40, for selecting specific predetermined operation programs form a set of predefined signal programs, i.e. different signal formations and other signal parameters.

In an experimental embodiment the acoustic transmitter array comprised of 24 horns in a 6×4 formation. (vertical×horizontal), creating together an acoustic phased—array that produces narrow beam at horizontal width of 8°÷10°. The beam was capable of being steered horizontally at sector range of ±42°, thus, increasing the area that can be influenced by the acoustic radiation. At the back of each horn, two drivers through "Y" shape splitter were attached.

Each horizontal line of 4 horns was fed by a single sound channel, thus, there were total of 6 sound channels. Operating all 6 lines of horns simultaneously, enabled the generation of the desired directional acoustic beam at the maximum intensity achieved by the 48 drivers of type SD370A. Each driver had maximum power of 100 Watts and resistance of 11 Ω at frequency range of 1000÷1500 Hz. The maximum power (sum of output power from all drivers) was therefore 4,800 Watts. All wiring of the drivers were connected to a fuse box, which, functioned as wire junction and protection unit for the drivers. The box contained 24 fuses, one fuse for each couple of drivers to prevent excessive current from reaching the drivers.

The amplifier unit included three dual channels, power amplifiers. Each amplifier was connected to two lines of horns—one channel for each line. The amplifiers increased the sound signal volume to meet the required output power from all six channels (six rows).

The technical specifications of the amplifiers were:

Max. output power @ 4 Ω load—1,400 Watts

Max. amplification—38 db

Internal power supply—switching type

Efficiency—about 60%

Thermal protection—to avoid over-heating

A remote control (RC) unit was used, responsible for creating the acoustic signal-signal shape, frequencies and volume, the overall operation of the system and the hydraulic control used to steer the antenna array (left-right). The RC unit contained signal generator, control circuits, power ON/OFF switch, program selection switch, power level control switch and steering control joystick. In addition, there were seven LEDs presenting the systems' power status, and monitor used to direct the radiated beam towards the selected target and view the effect.

The experimental system was designed to radiate sinusoidal acoustic signal at frequencies between 1,000÷1,300 Hz, and produce maximum energy in the spectral range where the human ear is mostly sensitive. In addition, there were more aspects to be considered, such as: human ability to adapt to pain and psychological stress reaction.

In order to achieve maximum effect, the signal generator was set to produce various signal forms:

a. Continuous wave (CW) at single frequencies between 1,000÷2,000 Hz.

b. Pulses at constant frequency with desired adjustable ratio between the pulse period and interval between the pulses.\ c. Pulses at variable level and frequency—like sirens.

The control unit contains three control mechanisms:

The experimental acoustic system control circuits comprised hydraulic system and electrical control circuits, and main power control circuits.

The acoustic system control was responsible for splitting the sound signal coming from the RC unit to the three amplifiers, while preserving the phase and amplitude of the signal. The circuits produced 12 VDC voltage needed for the internal controller, the video camera, the remote control unit and the command relay at the hydraulic unit. Also 6 VDC was produced for the RC unit. The output current of the six sound channels was sampled and the output power was displayed on an LCD screen, located at the front panel of the Control Unit. The roll of this display was to warn the operator about power drop on each channel separately. The circuit also transmitted the video signal from the camera to the RC unit monitor.

The hydraulic system electrical control was based on a pressure pushed piston, which moves in one direction under liquid pressure. In order to change the direction of the movement, one must activate pressure in the opposite direction. The system contained three pistons, one for changing the direction of the acoustic transmitters array, and the other two for stabilizing the base plate on which the whole system was mounted. The hydraulic control functions were to supply electric power to the hydraulic pump and control it's operation, and to actuate electric valves which enable liquid flow in the desired direction: left, right, and stabilizing the plate.

The main power control circuits controlled the amplifiers according to the commanding signals received from the RC unit. The circuit also provided warning about output power drop and display it by six LEDs on the RC unit.

The video camera was installed on the side of the horn array. The camera displayed for the operator the scene of targets towards which the acoustic beam was aimed. The video signal was transmitted by cable through the control unit to the monitor located at the RC unit.

A safety device to avoid drift current between the main supply lines and the ground was incorporated in the system—namely an isometer. It was designed to automatically cut off the electric power in case of exceeding the system limitations.

Figure 2:
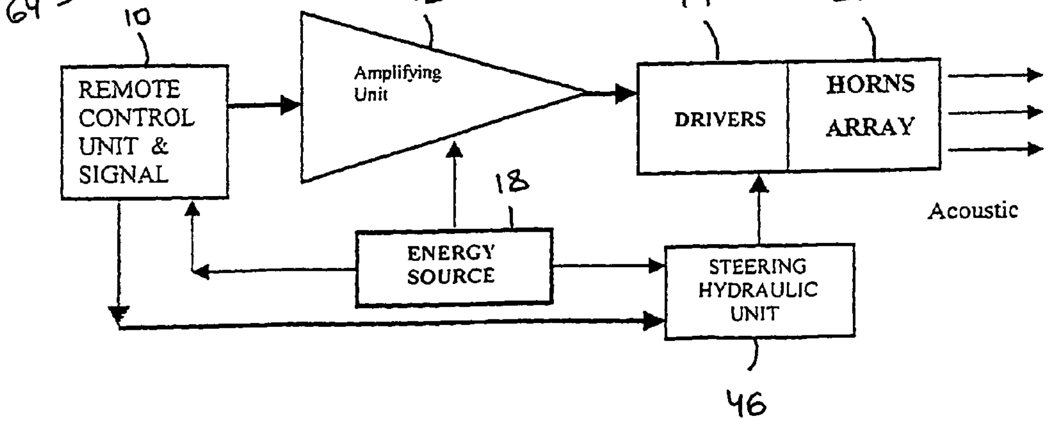
FIG. 2 illustrates a simplified block diagram of a high-power controlled acoustic beam generator for crowd control in accordance with another preferred embodiment of the present invention.

FIG. 2 illustrates a simplified block diagram of a high-power acoustic generator for crowd control in accordance with another preferred embodiment of the present invention.

Signal generator 10 (which, in a preferred embodiment of the present invention, may be actuated and controlled using a remote control unit) feeds via amplifier 12 into drivers 44, which produce acoustic signals through a horn array 22. Here steering is carried out mechanically, using a hydraulic steering unit 46.

The system may also include video monitoring in the form of a camera 60 and a monitor 62. In a preferred embodiment of the present invention the camera is designed to be aimed in the direction of the acoustic transmitters array (e.g. normal to the plane of the horns), with visual indication marks 64 so as to enable the operator of the system to determine in what sector, relative to the acoustic transmitters array, are the people to be subjected to the concentrated acoustic beam found, and select the appropriate beam direction. Aligning the camera is very simple. In one preferred mode of operation the camera is mounted on the frame carrying the acoustic transmitters array, and therefore is capable of tracking the direction at which the array is pointed to. Alternatively the camera may be positioned independently and steered in the direction the acoustic transmitters array is pointed to. Other visual source can be used as viewfinder to aim the acoustic beam towards the desired target. The target can be observed on the monitor at a remote control unit.

Figure 3:
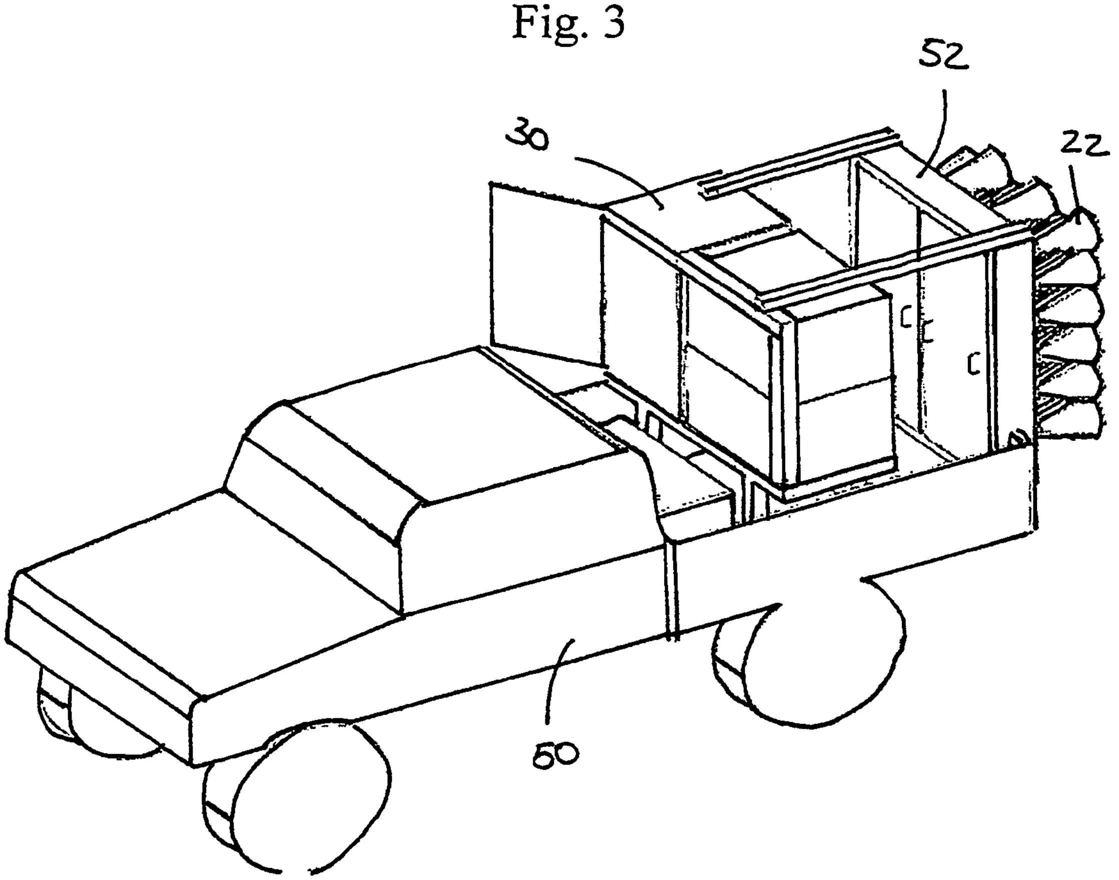
FIG. 3 illustrates a vehicle-mounted embodiment of a high-power controlled acoustic beam generator for crowd control in accordance with a preferred embodiment of the present invention.

FIG. 3 illustrates a vehicle-mounted embodiment of a high-power acoustic generator for crowd control in accordance with a preferred embodiment of the present invention. Here the system is mounted on a pickup truck 50, with the electronics of the system stored in box 52 and the control box 30 provided on the side of the truck to allow easy access.

Figure 4:
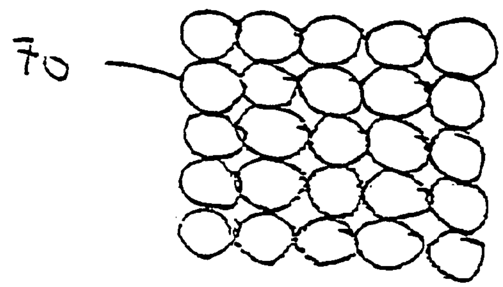
FIG. 4 illustrates an optional circular arrangement of horn outlets suitable for the acoustic transmitters array, in accordance with the present invention.

FIG. 4 illustrates an optional geometrical arrangement of horn outlets suitable for the acoustic transmitters array, in accordance with the present invention.

It is asserted that in order to enhance the efficiency of the system the transmitters array ought to be closely packed (as close as possible), maximizing the number of outlets of the transmitters per unit area.

In one embodiment (seen in FIG. 4) the horn outlets is circular, and the outlets are packed so that there is physical contact between adjacent outlets. This also enhances resonance.

Figure 5:
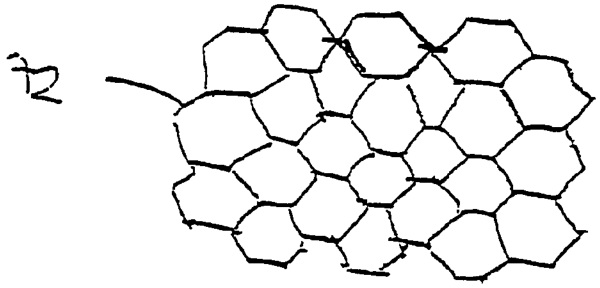
FIG. 5 illustrates an optional hexagonal, beehive-like arrangement of horn outlets suitable for the acoustic transmitters array, in accordance with the present invention.

In another alternative embodiment shown in FIG. 5 another optional geometrical arrangement of horn outlets suitable for the acoustic transmitters array, in accordance with the present invention.

Here the outlets of the horns are hexagonal and arranged in a beehive formation.

It is asserted that other polygonal shapes are suitable too for enhancing the performance of the system.

The system is designed to meet mobility requirements. In some preferred embodiments of the present invention the system may be carried either on a trailer or on a truck. In other embodiments it may be stationary.

In another experimental system in accordance with the present invention the acoustic transmitters array was made up of acoustic horns manufactured by ATLAS, capable of producing acoustic power (for the frequency range of 1-2 KHz) of 126 dB (at a distance of 2 meters). The Outlet of the horns was modified to be about 30 cm in diameter, and the drivers used were also manufactured by ATLAS (model SD 370). For an array of 48 acoustic transmitters the sound pressure level (SPL) was experimentally found to be in the range of 133-140 dB. Such noise level prevents human normal activity even if the human subjected to this noise level is wearing protection means such as earplugs or ear-seals.

The entire system may be optionally mounted on a metal base plate, suitable for installation at any desired mobile means: trucks, towed cart, ship or other platforms, or positioned in a stationary position.

In an alternative embodiment of the present invention, transmission of apparent or hidden messages between pulses or as background is possible. The influence of such messages might last long after the radiation ends, resulting in long lasting effect on the people subjected to the concentrated acoustic beam.

The operator (or operators) of the system may be stationed behind the acoustic transmitter array. It was found that the noise level behind the acoustic transmitter array was considerably lower than the noise level in front of the array, and was tolerable for humans for typical work periods (of up to several minutes). It is of course recommended that the operators use ear protection means to minimize the danger of temporal or permanent hearing loss.

Figure 6:
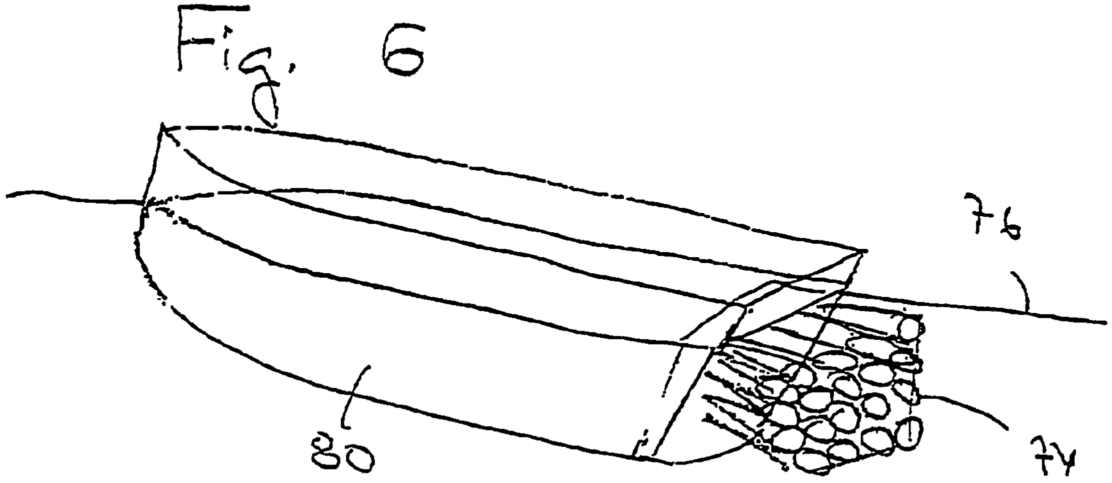
FIG. 6 illustrates a marine-vessel-mounted embodiment of a high-power controlled acoustic beam generator for crowd control in accordance with a preferred embodiment of the present invention.

In another preferred embodiment of the present invention, the system 74 is mounted on a boat 80 (see FIG. 6) or other marine vehicle, preferably below the water level 76 and directed below. This embodiment is suitable for law-enforcement or military marine units for use in driving away subaqueous intruders, for example from ports.

Figure 7:
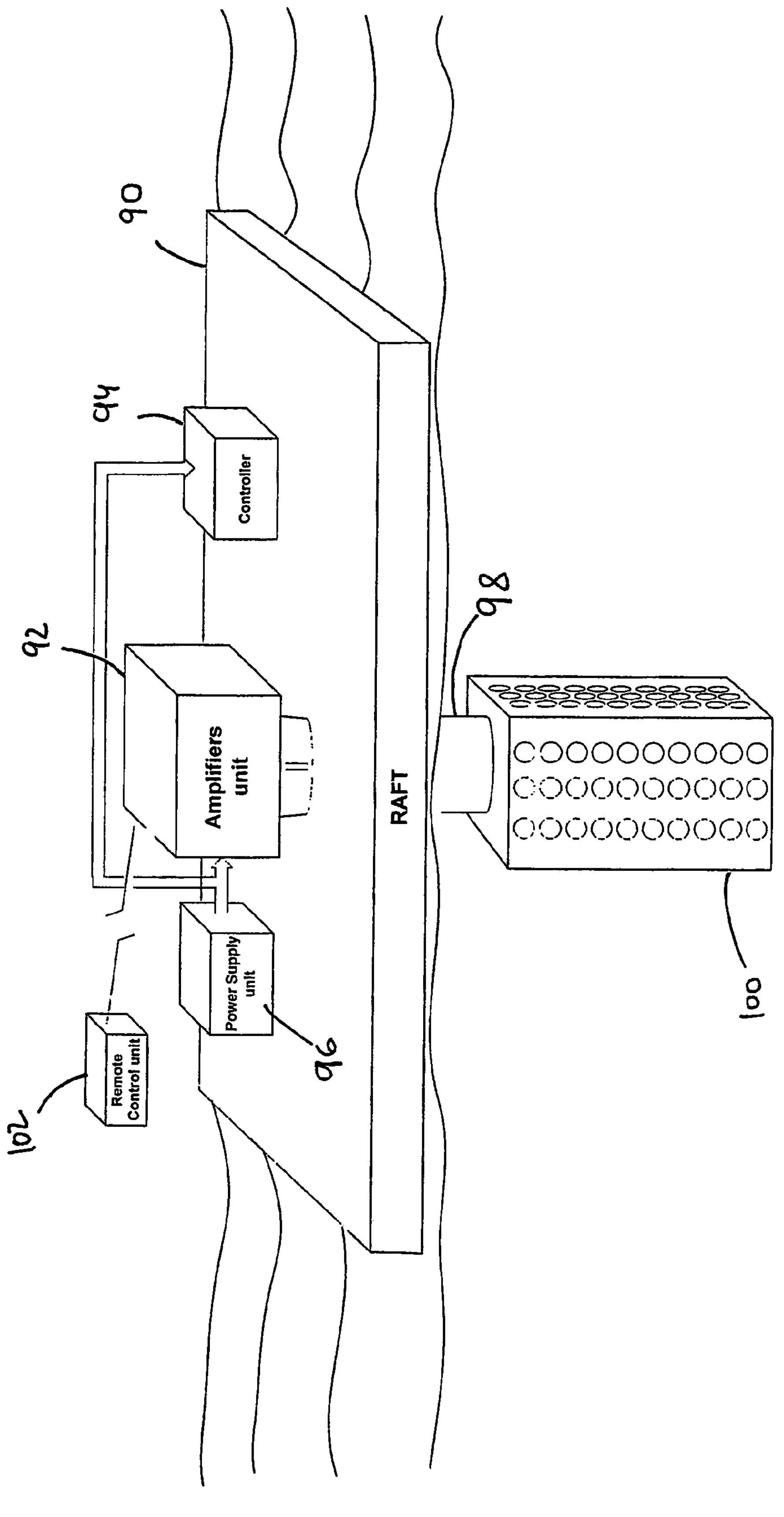
FIG. 7 illustrates another preferred embodiment of the present invention, on a floating platform.

FIG. 7 illustrates another preferred embodiment of the present invention, on a floating platform. The platform 90 may be specifically designated for the task of carrying the system of the present invention, or a floating platform originally designated for other purposes (such as an oil-rig, a floating dock, etc.). Platform 90 shown in FIG. 7 carries the power supply 96, amplifier unit 98 and the controller 94 on board, and below deck a pole 98 is provided carrying an array of acoustic transmitters 100, here shown in a quadruple configuration, having four sets of arrays of acoustic transmitters, each array pointing in a different direction, thus covering an entire underwater circle around the platform. In a preferred embodiment of the present invention, the sets of arrays of acoustic transmitters may be operated simultaneously or separately as desired.

In yet another embodiment of the present invention a stationary system is mounted subaqueously in port inlets, for fending off unlawful intruders.

In submerged systems water-proof insulation of submerged parts is required. For example, a high-power broadband piezoelectric transducer, marketed under the brand name "LUBELL LL-9162" may serve as the acoustic transmitter used for submerged systems.

In yet another preferred of the invention the system is airborne, mounted on an aircraft (like an airplane, a helicopter, a balloon or the like).

In another preferred embodiment of the present invention the system may incorporate transmission of hidden messages.

The specific parameters indicated in the account on the experimental system as well as any other parameters explicitly indicated herein, unless otherwise stated are given as examples only, and in no way limit the scope of the present invention.

The invention claimed is:

1. A controlled acoustic beam generator system comprising:
- an array of acoustic transmitters;
- a signal generator, for generating an acoustic signal of predetermined properties;
- an amplifier for amplifying the acoustic signal;
- multi-channels signal processor, for processing the acoustic signal, distributing corresponding processed acoustic signals, having predetermined properties, including amplitude and phase, into the array of acoustic transmitters;
- phased array arrangement, where each channel is fed with wave parameters comprising amplitude and phase according to predefined signal programs, for steering an acoustic beam which is the resultant of the signal programs by the array of acoustic transmitters;
- a control unit, for the operation of the system, by controlling the signal generator, the multi-channel signal processor, and the phased array arrangement.

2. The system of claim 1, wherein the phased array arrangement is incorporated in the multi-channels signal processor.

3. The system of claim 1, wherein the system comprises mechanical steering means.

4. The system of claim 3, wherein the mechanical steering means comprises a hydraulic steering device.

5. The system of claim 1, wherein the system is powered from the main power supply.

6. The system of claim 1, wherein the system is powered from a power supply generator.

7. The system of claim 1, wherein the control unit is partially or in whole a remote control unit.

8. The system of claim 1, wherein the control unit is provided with a beam direction selector for selecting a desired direction for the acoustic beam.

9. The system of claim 1, wherein the control unit is provided with a program selector, for selecting a desired signal program, from a set of the predefined signal programs.

10. The system of claim 1, wherein the control unit is provided with a power level selector for selecting a desired power level for the system.

11. The system of claim 1, wherein the system is adapted to be mounted on a vehicle.

12. The system of claim 1, wherein the system is adapted to be mounted on a marine vessel.

13. The system of claim 12, wherein the array of acoustic transmitters is adapted to be mounted below water level.

14. The system of claim 1, wherein the system is adapted to be mounted on a floating platform.

15. The system of claim 14, wherein the array of acoustic transmitters is adapted to be mounted submerged below water level.

16. The system of claim 1, wherein the array of acoustic transmitters comprises a plurality of sets of acoustic transmitter arrays.

17. The system of claim 16, wherein sets of acoustic transmitter arrays are operable separately or simultaneously as desired.

18. The system of claim 1, wherein the system is adapted to be airborne.

19. The system of claim 1, incorporating transmission of hidden messages.

20. The system of claim 1, wherein it is mounted on a stationary support.

21. The system of claim 1, wherein the system is submerged in water.

22. The system of claim 1, wherein the array of acoustic transmitters comprises acoustic transmitters having outlets of uniform shape.

23. The system of claim 22, wherein the uniform shape is circular.

24. The system of claim 22, wherein the uniform shape is polygonal.

25. The system of claim 24, wherein the uniform shape is hexagonal.

26. The system of claim 24, wherein the array of acoustic transmitters is arranged in a beehive formation.

27. The system of claim 1, wherein the signal generator generates continuous wave acoustic signals.

28. The system of claim 1, wherein the signal generator generates acoustic signal pulses at constant frequency with desired adjustable ratio between the pulse period and interval between the pulses.

29. The system of claim 1, wherein the signal generator generates acoustic signal pulses at variable amplitude levels and frequencies.

* * * * *